(12) United States Patent
Hwang et al.

(10) Patent No.: US 9,791,608 B2
(45) Date of Patent: *Oct. 17, 2017

(54) POLARIZING PLATE AND LIQUID CRYSTAL DISPLAY COMPRISING THE SAME

(75) Inventors: In Ho Hwang, Daejeon (KR); Ki Ok Kwon, Daejeon (KR); No Ma Kim, Daejeon (KR); Sung Hyun Nam, Daejeon (KR); In Kyu Park, Daejeon (KR); Sung Soo Yoon, Daejeon (KR); Kyun Il Rah, Daejeon (KR); Min Ki Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/580,333

(22) PCT Filed: Feb. 28, 2011

(86) PCT No.: PCT/KR2011/001402
§ 371 (c)(1),
(2), (4) Date: Aug. 21, 2012

(87) PCT Pub. No.: WO2011/105874
PCT Pub. Date: Sep. 1, 2011

(65) Prior Publication Data
US 2012/0314160 A1    Dec. 13, 2012

(30) Foreign Application Priority Data

Feb. 26, 2010  (KR) .................. 10-2010-0017655
Feb. 28, 2011  (KR) .................. 10-2011-0018048

(51) Int. Cl.
*G02F 1/1335*    (2006.01)
*G02B 5/30*      (2006.01)
*C09J 7/02*      (2006.01)

(52) U.S. Cl.
CPC .......... *G02B 5/305* (2013.01); *G02B 5/3041* (2013.01); *B32B 2457/202* (2013.01);
(Continued)

(58) Field of Classification Search
CPC ............ G02F 1/1335; G02F 1/133528; G02F 2201/54; G02F 2202/28; G02B 5/30;
(Continued)

(56) References Cited

U.S. PATENT DOCUMENTS 6,074,729 A *  6/2000  Watanabe et al. ............ 428/212
9,256,005 B2 * 2/2016  Huh ...................... G02B 5/3033
(Continued)

FOREIGN PATENT DOCUMENTS

JP    09033723 A    2/1997
JP    10044292 A    2/1998
(Continued)

OTHER PUBLICATIONS

Suzuki et al., JP 2009205141, English Translation from http:dossier1.ipdl.inpit.go.jp/AIPN/odse_top_dn.ipdl?N0000=7400.*
(Continued)

*Primary Examiner* — Eli D Strah
(74) *Attorney, Agent, or Firm* — Dentons US LLP

(57) ABSTRACT

The present invention relates to a polarizing plate and a liquid crystal display device. In the present invention, the polarizing plate is lightweight and has a small thickness and excellent properties including durability, water resistance, workability, pressure-sensitive adhesion and light leakage prevention ability; and the liquid crystal display device including the same are provided.

11 Claims, 2 Drawing Sheets

(52) U.S. Cl.
CPC ........ *C09J 7/0217* (2013.01); *C09J 2201/134* (2013.01); *C09J 2201/606* (2013.01); *G02F 1/133528* (2013.01); *G02F 2201/54* (2013.01); *G02F 2202/28* (2013.01); *Y10T 428/105* (2015.01); *Y10T 428/1041* (2015.01); *Y10T 428/1077* (2015.01)

(58) Field of Classification Search
CPC ...... G02B 5/3041; G02B 5/305; C09J 133/00; C09J 133/08; C09J 133/10; C09J 133/12; C09J 7/0217; C09J 2201/134; C09J 2201/606; B32B 7/12; B32B 37/12; B32B 2457/202; Y10T 428/1041; Y10T 428/105; Y10T 428/1077
USPC ........... 156/106, 247; 349/96–103, 122–138; 427/207.1, 208, 208.4, 208.6, 208.8; 428/1.1, 1.3, 1.5, 355 R, 355 EN, 355 BL, 428/355 AC, 356; 524/236, 356, 555, 524/556; 525/329.9, 330.5; 526/931
See application file for complete search history.

(56) References Cited

U.S. PATENT DOCUMENTS

| | | | |
|---|---|---|---|
| 2004/0191509 A1* | 9/2004 | Kishioka et al. | 428/354 |
| 2006/0099411 A1 | 5/2006 | Xia et al. | |
| 2006/0128925 A1* | 6/2006 | Arai et al. | 528/44 |
| 2007/0148485 A1* | 6/2007 | Kusama et al. | 428/520 |
| 2010/0002298 A1* | 1/2010 | Sugino et al. | 359/485 |
| 2010/0143685 A1* | 6/2010 | Nakayama et al. | 428/220 |
| 2011/0007244 A1* | 1/2011 | Kim et al. | 349/96 |
| 2011/0043733 A1* | 2/2011 | Suzuki | C09J 135/04 349/96 |
| 2011/0149211 A1* | 6/2011 | Ha et al. | 349/96 |
| 2012/0314161 A1* | 12/2012 | Park et al. | 349/96 |
| 2012/0320317 A1* | 12/2012 | Yoon et al. | 349/96 |
| 2012/0328800 A1* | 12/2012 | Yoon et al. | 428/1.55 |
| 2014/0168580 A1* | 6/2014 | Huh et al. | 349/96 |
| 2014/0240647 A1* | 8/2014 | Huh et al. | 349/96 |

FOREIGN PATENT DOCUMENTS

| | | | | |
|---|---|---|---|---|
| JP | 2001-294828 A | 10/2001 | | |
| JP | 2002-014226 A | 1/2002 | | |
| JP | 2004-264333 A | 9/2004 | | |
| JP | 2006-63189 A | 3/2006 | | |
| JP | 2007-147797 A | 6/2007 | | |
| JP | 2007-304317 A | 11/2007 | | |
| JP | 2008-165199 A | 7/2008 | | |
| JP | 2009-205141 A | 9/2009 | | |
| JP | 2009205141 A * | 9/2009 | | G02B 5/30 |
| JP | 2010009027 A | 1/2010 | | |
| JP | 2013-520706 A | 6/2013 | | |
| KR | 10-2010-0078564 | 7/2010 | | |
| TW | 200942592 | 10/2009 | | |
| WO | WO 2009088205 A2 * | 7/2009 | | G02B 1/11 |
| WO | WO 2010021505 A2 * | 2/2010 | | C09J 133/08 |

OTHER PUBLICATIONS

Kamath et al., The Determination of Polymer Relaxation Moduli and Memory Functions Using Integral Transforms, 1989, Journal of Non-Newtonian Fluid Mechanics, 32, 119-144.*

* cited by examiner

POLARIZING PLATE AND LIQUID CRYSTAL DISPLAY COMPRISING THE SAME

This application is a National Stage Entry of International Application No. PCT/KR2011/001402, filed Feb. 28, 2011, and claims the benefit of Korean Application Nos. 10-2010-0017655, filed on Feb. 26, 2010, and 10-2011-0018048, filed on Feb. 28, 2011, which are hereby incorporated by reference in their entirety for all purposes as if fully set forth herein.

TECHNICAL FIELD

The present invention relates to a polarizing plate and a liquid crystal display device.

BACKGROUND ART

A liquid crystal display (LCD) device is applied in various fields because it has low power consumption and can be formed into a thin plane.

An LCD device includes a liquid crystal panel including a liquid crystal present between transparent substrates and polarizing plates attached to both surfaces of the liquid crystal panel.

The polarizing plate generally has a structure shown in FIG. 1. That is, the polarizing plate 1 may include a polarizer 11, and protective films 12a and 12b attached to both surfaces of the polarizer 11. The polarizing plate 1 may also include a pressure-sensitive adhesive layer 13 formed under the protective film 12b and used to attach to a liquid crystal panel, and may further include a releasing film 14 formed under the pressure-sensitive adhesive layer 13. Although not shown in FIG. 1, the polarizing plate may include an additional functional film such as a reflection preventing film.

In such a structure of the conventional polarizing plate, to provide a device having a smaller thickness and light weight, for example, as described in Japanese Patent Publication No. 2002-014226, there have been attempts to form the polarizing plate while omitting one of the protective films 12a and 12b formed on both surfaces of the conventional polarizer 11.

However, it is difficult to provide a polarizing plate with desired performance without using a protective film.

PRIOR ART REFERENCES

Patent References

[Patent Reference No. 1] JP publication of patent application No. 2002-014226

DISCLOSURE

Technical Problem

The present invention is directed to a polarizing plate and a liquid crystal display device.

Technical Solution

The present invention relates to a polarizing plate including: a polarizer and a pressure-sensitive adhesive layer attached to at least one surface of the polarizer and having a first surface and a second surface which have different tensile moduli.

Hereinafter, the polarizing plate of the present invention will be described in further detail. In one example, a first surface of the pressure-sensitive adhesive layer may be attached to a polarizer, and a second surface thereof may be a pressure-sensitive adhesive surface for attaching the polarizing plate to a liquid crystal panel. Here, the first surface may have a higher tensile modulus than the second surface.

A polarizer is a functional film or sheet capable of extracting light vibrating in only one direction from incident light vibrating in various directions. In a structure of a conventional polarizing plate, protective films such as triacetyl cellulose (TAC) films are generally attached to both surfaces of such a polarizer. In the polarizing plate of the present invention, at least one of the above-mentioned protective films is omitted. That is, in the present invention, at least one surface of the polarizer does not have a protective film attached thereto, and the pressure-sensitive adhesive layer may be attached to a surface of the polarizer to which the protective film is not attached. Also, the pressure-sensitive adhesive layer may function to attach the polarizing plate of the present invention to a liquid crystal display panel.

FIG. 2 is a cross-sectional view of an exemplary polarizing plate 2 according to the present invention. As shown in FIG. 2, the polarizing plate 2 may include a polarizer 21 and a pressure-sensitive adhesive layer 22 formed on one surface of the polarizer 21. In FIG. 2, a protective film 23 is attached to the surface of the polarizer 21 on which the pressure-sensitive adhesive layer 22 is not formed. However, the polarizing plate 2 of FIG. 2 is an example of the present invention, and for example, neither surface of the polarizer may have a protective film attached thereto.

As the polarizer, a general one known in the art, for example, a polyvinyl alcohol-based polarizer may be used. For example, such a polarizer may be a type in which a dichroic dye is aligned with a polyvinyl alcohol-based resin film through adsorption. The polyvinyl alcohol-based resin constituting the polarizer may be, for example, obtained by forming a polyvinyl acetate-based resin into a gel. As the polyvinyl acetate-based resin, a homo-polymer of vinyl acetate; and a co-polymer of vinyl acetate and another monomer co-polymerizable with the vinyl acetate may be used. Examples of the monomer co-polymerizable with vinyl acetate may include, but are not limited to, one or a mixture of at least two of unsaturated carboxylic acids, olefins, vinyl ethers, unsaturated sulfonic acids and acrylamides having an ammonium group. A gelling degree of the polyvinyl alcohol-based resin may generally be 85 to 100 mol %, and preferably 98 mol % or more. The polyvinyl alcohol-based resin may be further modified, and may be, for example, polyvinyl formal or polyvinyl acetal modified with aldehydes. Furthermore, a degree of polymerization of the polyvinyl alcohol-based resin may be approximately 1000 to 10000, and preferably 1500 to 5000.

The polarizer is formed of a hydrophilic resin such as polyvinyl alcohol, and thus is generally vulnerable to moisture. The polarizer is formed through a stretching process, and thus easily shrinks under moist conditions, resulting in degradation in the optical characteristics of the polarizing plate. Accordingly, in a structure of the conventional polarizing plate, to reinforce the strength of the polarizer, as shown in FIG. 1, it is common for a protective film, for example, a TAC film, to be formed on both surfaces of the polarizer. When a protective film is not used, due to low dimensional stability of the polarizer, durability or optical properties of the polarizing plate are diminished.

In the present invention, the polarizer does not have a protective film, but has a pressure-sensitive adhesive layer. Here, as an elastic modulus on both surfaces of the pressure-sensitive adhesive layer is different, the above-mentioned problems may be resolved. When the protective film is removed, a thinner and lighter polarizing plate may be provided. Such a polarizing plate may be referred to as a thin polarizing plate throughout the specification.

That is, at least one surface of the polarizer has no protective film attached thereto, and the first surface, that is, a surface having a higher tensile modulus, of the pressure-sensitive adhesive layer may be attached to the surface of the polarizer to which no protective film is attached.

FIG. 3 illustrates the pressure-sensitive adhesive layer 3 having a first surface 31 and a second surface 32.

When the pressure-sensitive adhesive layer has a high tensile modulus of the first surface attached to the polarizer as described above, contraction or expansion of the polarizer may be inhibited under severe conditions such as high temperature or high humidity. As the second surface, attaching the polarizing plate to a glass substrate of a liquid crystal panel, has a low tensile modulus, the polarizing plate may have excellent wettability to an adherent. In one example, the first surface may have a tensile modulus at 25° C. of 1 to 1000 MPa, preferably 10 to 900 MPa, and more preferably, 250 to 900 MPa. In another example, the second surface may have a tensile modulus at 25° C. of 0.01 to 1.0 MPa, preferably 0.02 to 0.8 MPa, and more preferably 0.03 to 0.7 MPa. When the tensile moduli of the first and second surfaces are controlled within the above-mentioned range, respectively, the pressure-sensitive adhesive layer may effectively inhibit the contraction or expansion of the polarizer under severe conditions, and have excellent wettability to the adherent such as a glass substrate as well.

A method of forming such a pressure-sensitive adhesive layer having different tensile moduli on both surfaces thereof is not particularly limited. In one example, the pressure-sensitive adhesive layer may have a multi-layered structure formed by stacking at least two kinds of pressure-sensitive adhesive layers having different tensile moduli.

For example, as shown in FIG. 4, the pressure-sensitive adhesive layer 4 may include a first pressure-sensitive adhesive layer 41 forming a first surface 31, and a second pressure-sensitive adhesive layer 42 forming a second surface 32. Here, the pressure-sensitive adhesive layers 41 and 42 may have different tensile moduli, thereby implementing pressure-sensitive adhesive layers having different tensile moduli on both surfaces thereof. The pressure-sensitive adhesive layer may be formed in a double-layered structure shown in FIG. 4 or a multi-layered, for example, at least triple-layered, structure in some cases. However, it is preferable that the pressure-sensitive adhesive layer be formed in a double-layered structure in consideration of efficiency to form a thin polarizing plate.

The pressure-sensitive adhesive layer may have a total thickness of approximately 10 to 80 μm, preferably 20 to 60 μm, and more preferably 30 to 60 μm. By controlling the total thickness of the pressure-sensitive adhesive layer in the above-mentioned range, it is possible to provide a polarizing plate, which has a small thickness and excellent physical properties such as durability under a severe condition. If the pressure-sensitive adhesive layer is formed in a double-layered structure shown in FIG. 4, the first pressure-sensitive adhesive layer may have a thickness of 4 to 50 μm, and the second pressure-sensitive adhesive layer may have a thickness of 5 to 50 μm. The contraction or expansion of the polarizer may be effectively prevented by controlling the thickness of the first pressure-sensitive adhesive layer in a range of 4 to 50 μm. Furthermore, the wettability of the pressure-sensitive adhesive layer or the durability of the polarizing plate may be effectively maintained by controlling the thickness of the second pressure-sensitive adhesive layer in a range of 5 to 50 μm.

In the present invention, a method of forming the pressure-sensitive adhesive layer is not particularly limited. For example, the pressure-sensitive adhesive layer may be formed by curing a conventional room temperature curable, moisture curable, thermal curable or photocurable pressure-sensitive adhesive composition. Furthermore, to implement a multi-layered pressure-sensitive adhesive layer, a coating and curing process of the pressure-sensitive adhesive composition may be sequentially repeated, or separately formed pressure-sensitive adhesive layers may be laminated. Curing the pressure-sensitive adhesive composition refers to expressing a pressure-sensitive adhesive characteristic in the pressure-sensitive adhesive composition through physical action or chemical reaction by irradiating light, maintaining the pressure-sensitive adhesive composition at a predetermined temperature or providing a suitable level of humidity.

In one example, when the pressure-sensitive adhesive layer is formed in a multi-layered structure, it is preferable that the pressure-sensitive adhesive layer disposed on the side of the polarizer, for example, the first pressure-sensitive adhesive layer in the double-layered structure, be formed of a photocurable pressure-sensitive adhesive composition, but the present invention is not limited thereto. The term "photocurable pressure-sensitive adhesive composition" may refer to a pressure-sensitive adhesive composition, which may be cured by inducing a cross-linking or polymerization reaction due to irradiation of an electromagnetic wave such as a UV ray or electron beam.

In one example, the pressure-sensitive adhesive layer may include an interpenetrating polymer network (referred to as an "IPN"). The term "IPN" may indicate a state in which at least two kinds of cross-linking structures are present in a pressure-sensitive adhesive layer, and in one example, the cross-linking structure may be present in an entanglement, linking or penetrating state. When the pressure-sensitive adhesive layer includes the IPN, a polarizing plate having excellent durability, workability, optical characteristic and an ability to prevent light leakage under severe conditions may be implemented.

When the pressure-sensitive adhesive layer includes the IPN structure, the pressure-sensitive adhesive layer may include a cross-linking structure of an acryl polymer cross-linked by a multifunctional cross-linking agent and a cross-linking structure of a polymerized multifunctional acrylate.

The acryl polymer cross-linked by the multifunctional cross-linking agent may have a weight average molecular weight ($M_w$) of 500,000 or more. The weight average molecular weight is a converted figure for standard polystyrene measured by gel permeation chromatography (GPC). Herein, unless specifically defined otherwise, the term "molecular weight" indicates "weight average molecular weight." When the molecular weight of the polymer is set at 500,000 or more, the pressure-sensitive adhesive layer may have excellent durability under severe conditions. The upper limit of the molecular weight is not particularly limited, and may be controlled in a range of 2,500,000 or less in consideration of the durability of the pressure-sensitive adhesive or coatability of the composition.

In one example, the acryl polymer may include a (meth) acrylic acid ester-based monomer and a cross-linkable monomer as polymerization units, and preferably includes 50 to 99.9 parts by weight of the (meth)acrylic acid ester-based monomer and 0.1 to 50 parts by weight of the cross-linkable monomer, which are polymerized. Here, the "cross-linkable monomer" refers to a monomer, which may be co-polymerized with the (meth)acrylic acid ester-based monomer, and provide a cross-linkable functional group to a side chain or end of the polymer after co-polymerization. Herein, unless specifically described otherwise, the unit "part(s) by weight" refers to a ratio of weight. A weight ratio of monomers included in the polymer is controlled as mentioned above, and thus a pressure-sensitive adhesive having excellent early adhesion or durability can be provided.

As the (meth)acrylic acid ester-based monomer, alkyl (meth)acrylate may be used. In consideration of cohesion, glass transition temperature or adhesion of the pressure-sensitive adhesive, alkyl(meth)acrylate including an alkyl group having 1 to 14 carbon atoms may be used. Examples of such monomers may include methyl(meth)acrylate, ethyl (meth)acrylate, n-propyl(meth)acrylate, isopropyl(meth) acrylate, n-butyl(meth)acrylate, t-butyl (meth)acrylate, sec-butyl(meth)acrylate, pentyl(meth)acrylate, 2-ethylhexyl (meth)acrylate, 2-ethylbutyl(meth)acrylate, n-octyl(meth) acrylate, isooctyl(meth)acrylate, isononyl(meth)acrylate, lauryl(meth)acrylate and tetradecyl(meth)acrylate, and may be used alone or in combination of at least two thereof.

The cross-linkable monomer may function to control the durability, adhesion and cohesion of the pressure-sensitive adhesive. For example, the cross-linkable monomer may provide a hydroxyl group, a carboxyl group, an epoxy group, an isocyanate group or a nitrogen-containing functional group such as an amino group, to the polymer. The cross-linkable monomer may also be copolymerized with the (meth)acrylic acid ester-based monomer. Various monomers serving as such are known in the art, and all of the monomers described above may be used herein. Examples of the cross-linkable monomers may include, but are not limited to, a hydroxy-containing monomer such as 2-hydroxyethyl (meth)acrylate, 2-hydroxypropyl(meth)acrylate, 4-hydroxybutyl(meth)acrylate, 6-hydroxyhexyl (meth)acrylate, 8-hydroxyoctyl(meth)acrylate, 2-hydroxyethyleneglycol (meth) acrylate or 2-hydroxypropyleneglycol (meth)acrylate; a carboxy-containing monomer such as (meth)acrylic acid, 2-(meth)acryloyloxy acetic acid, 3-(meth)acryloyloxy propionic acid, 4-(meth)acryloyloxy butyric acid, an acrylic acid dimer, an itaconic acid, a maleic acid and a maleic acid anhydride; and a nitrogen-containing monomer such as (meth)acrylamide, N-vinyl pyrrolidone or N-vinyl caprolactame, which may be used alone or in combination of at least two thereof.

If necessary, the acryl polymer may be further included in the form in which the monomer represented by Formula 1 is polymerized. Such a monomer may be added to control the glass transition temperature and provide other functionalities.

[Formula 1]

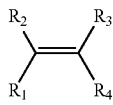

In Formula 1, $R_1$ to $R_3$ are each independently hydrogen or alkyl, $R_4$ is cyano, alkyl-substituted or unsubstituted phenyl; acetyloxy; or $COR_5$. Herein, $R_5$ is alkyl- or alkoxyalkyl-substituted or unsubstituted amino or glycidyloxy.

In the definitions of $R_1$ to $R_5$ of Formula 1, alkyl or alkoxy refers to alkyl or alkoxy having 1 to 8 carbon atoms, and preferably methyl, ethyl, methoxy, ethoxy, propoxy or butoxy. The monomer of Formula 1 may be present up to 20 parts by weight with respect to the weight of the (meth) acrylic acid ester-based monomer or cross-linkable monomer, but the weight may be changed according to its purpose.

The acryl polymer may be prepared of a mixture of monomers having the above-mentioned components by a conventional polymerization method such as solution polymerization, photopolymerization, bulk polymerization, suspension polymerization or emulsion polymerization.

A multifunctional cross-linking agent capable of cross-linking such an acryl polymer in the pressure-sensitive adhesive layer may be, but is not limited to, a common cross-linking agent such as an isocyanate cross-linking agent, an epoxy cross-linking agent, an aziridine cross-linking agent, and a metal chelate cross-linking agent, and preferably an isocyanate cross-linking agent. The isocyanate cross-linking agent may be a multifunctional isocyanate compound such as tolylene diisocyanate, xylene diisocyanate, diphenylmethane diisocyanate, hexamethylene diisocyanate, isophoron diisocyanate, tetramethylxylene diisocyanate or naphthalene diisocyanate, or a compound obtained by reaction of the multifunctional isocyanate compound with a polyol compound such as trimethylol propane. The epoxy cross-linking agent may include at least one selected from the group consisting of ethyleneglycol diglycidylether, triglycidylether, trimethylolpropane triglycidylether, N,N,N',N'-tetraglycidyl ethylenediamine and glycerin diglycidylether. The aziridine cross-linking agent may include at least one selected from the group consisting of, but is not limited to, N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphine oxide. In addition, the metal chelate cross-linking agent may be, but is not limited to, a compound in which a polyvalent metal such as aluminum, iron, zinc, tin, titanium, antimony, magnesium and/or vanadium is coordinated with acetyl acetone or ethyl acetoacetate.

The pressure-sensitive adhesive may include such a multifunctional cross-linking agent in an amount of 0.01 to 10 parts by weight, and preferably 0.01 to 5 parts by weight with respect to 100 parts by weight of the above-mentioned acryl polymer. In such a range, the pressure-sensitive adhesive may maintain excellent cohesion or durability.

The multifunctional cross-linking agent may crosslink the polymer by reaction with a cross-linkable functional group of the acryl polymer during the formation of the pressure-sensitive adhesive layer, for example, an aging process.

The IPN-structured pressure-sensitive adhesive layer may include a cross-linking structure implemented by an acryl polymer cross-linked by the multifunctional cross-linking agent and a cross-linking structure by a polymerized multifunctional acrylate.

The multifunctional acrylate may be a compound having at least two (meth)acryloyl groups in the molecule, and may be used without limitation. Examples of the multifunctional acrylate to be used herein may include, but are not limited to: bifunctional acrylates such as 1,4-butanediol di(meth) acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecane dimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; tetrafunctional acrylates such as diglycerin tetra(meth)acrylate or pentaerythritol tetra(meth)acrylate; pentafunctional acrylates such as propionic acid-modified dipentaerythritol penta(meth)acrylate; and hexafunctional acrylates such as dipentaerythritol hexa(meth)acrylate, caprolactone-modified dipentaerythritol hexa(meth)acrylate, or urethane (meth)acrylate (e.g. a reaction product of an isocyanate monomer and trimethylolpropane tri(meth)acrylate). In some cases, a photocurable oligomer known in the art, for example, urethane acrylate, polycarbonate acrylate, polyester acrylate, polyether acrylate or epoxy acrylate, and the like, may be also used.

The multifunctional acrylate may be used alone or in combination of at least two thereof. It is preferable that an acrylate having a molecular weight of less than 1000 and with at least trifunctionality be used for durability, but the present invention is not limited thereto.

It is preferable that the multifunctional acrylate have a ring structure in the backbone structure. Due to the use of such an acrylate, the contraction or expansion of the polarizer may be effectively inhibited, and a light leakage prevention effect may be improved. The ring structure included in the multifunctional acrylate may be any one of carbocyclic or heterocyclic, or monocyclic or polycyclic structures. Examples of the multifunctional acrylates including a ring structure may include, but are not limited to, hexafunctional acrylates such as a monomer having an isocyanurate structure (e.g., tris(meth)acryloxy ethyl isocyanurate) and isocyanate-modified urethane (meth)acrylate (e.g., a reaction product of isocyanate monomer and tirmethylolpropane tri(meth)acrylate, etc.).

The multifunctional acrylate in the pressure-sensitive adhesive layer may be present in an amount of 20 to 200 parts by weight with respect to 100 parts by weight of the acryl polymer, and thus may more effectively control the tensile modulus of the pressure-sensitive adhesive layer and maintain excellent durability.

In addition, the pressure-sensitive adhesive layer may further include a silane coupling agent. The silane coupling agent functions to increase cohesion and adhesion stability of the pressure-sensitive adhesive, thereby improving heat and moisture resistance, and also improve adhesion reliability even when the pressure-sensitive adhesive is left for a long time under severe conditions. Examples of the silane coupling agents may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyacetotrimethoxy silane, which may be used alone or in combination of at least two thereof. The present invention may use, but is not limited to, a silane-based coupling agent having an acetoacetate group or β-cyanoacetyl group. In the pressure-sensitive adhesive layer, the silane coupling agent is present in an amount of 0.01 to 5 parts by weight, preferably, 0.01 to 1 parts by weight with respect to 100 parts by weight of the acryl polymer, and thus may effectively maintain adhesion and durability.

The pressure-sensitive adhesive layer may further include a tackifying resin. As the tackifying resin, a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin or polymerized rosin ester resin may be used alone or in combination of at least two thereof. The tackifying resin may be present in an amount of 1 to 100 parts by weight with respect to 100 parts by weight of the acryl polymer. The pressure-sensitive adhesive layer may further include at least one additive selected from the group consisting of an epoxy resin, a curing agent, a UV stabilizer, an antioxidant, a colorant, a reinforcing agent, a filler, an antifoaming agent, a surfactant, and a plasticizer without affecting the effect of the present invention.

A method for forming such a pressure-sensitive adhesive layer is not particularly limited. In one example, the pressure-sensitive adhesive layer may be formed by preparing a pressure-sensitive adhesive composition by blending the above-mentioned components, coating the resulting composition on the polarizer or a suitable process substrate using conventional means such as a bar coater or a comma coater, and curing the resulting composition. The method of curing the pressure-sensitive adhesive composition is not particularly limited. For example, the pressure-sensitive adhesive composition may be cured by sequentially or simultaneously performing a process of aging the composition at a suitable temperature for the cross-linking reaction of the acryl polymer with the multifunctional cross-linking agent and a process of irradiating an electromagnetic wave to enable the polymerization of the multifunctional acrylate. Here, the irradiation of the electromagnetic wave may be performed using a means such as a high pressure mercury lamp, an electrodeless lamp, or a xenon lamp. In addition, the conditions for irradiating an electromagnetic wave are not particularly limited, as long as they can be controlled for the polymerization of the multifunctional acrylate to be suitably performed without degrading general physical properties. For example, the illuminance is controlled in a range of 50 to 2000 mW/cm$^2$, and the amount of light is controlled in a range of 10 to 1000 mJ/cm$^2$, and then the irradiation may be performed for a suitable time.

Meanwhile, in consideration of the efficiency of the curing process according to the irradiation of the electromagnetic wave, a photoinitiator may be included in the pressure-sensitive adhesive composition. As the photoinitiator, any that can produce a radical by the irradiation of the electromagnetic wave and initiate the curing reaction may be used without limitation. Examples of the photoinitiators may include, but are not limited to, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylantraquinone, 2-ethylantraquinone, 2-t-butylantraquinone, 2-aminoantraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphineoxide, which may be used alone or in combination of at least two thereof.

The photoinitiator may be present in an amount of 0.2 to 20 parts by weight, preferably 0.2 to 10 parts by weight, and more preferably 0.2 to 5 parts by weight with respect to 100 parts by weight of the acryl polymer. The photoinitiator may be present in an amount of 0.2 to 20 parts by weight with respect to 100 parts by weight of the multifunctional acrylate. The reaction of the multifunctional acrylate may be effectively induced through the controls described above, and the degradation of the properties of the pressure-sensitive adhesive, due to remaining components after curing, may be prevented.

In the present invention, the pressure-sensitive adhesive layer may be formed using a thermocurable or room temperature curable pressure-sensitive adhesive composition. In this case, the pressure-sensitive adhesive layer may include an acryl polymer cross-linked by a multifunctional cross-linking agent.

The acryl polymer may have a molecular weight of 500000 to 2500000, which is similar to that used for the above-mentioned photocurable composition, and may be a polymer including a (meth)acrylic acid ester-based monomer and a cross-linkable monomer as polymerization units, specifically, a polymer including 80 to 99.9 parts by weight of (meth)acrylic acid ester-based monomer and 0.1 to 20 parts by weight of a cross-linkable monomer as polymerization units. Here, specific kinds of the (meth)acrylic acid ester-based monomer and the cross-linkable monomer or a method of preparing the polymer are described above. The polymer may also include a functional monomer as represented by Formula 1.

Also as a multifunctional cross-linking agent cross-linking an acryl polymer in the pressure-sensitive adhesive layer, an isocyanate cross-linking agent, an epoxy cross-linking agent, an aziridine cross-linking agent, or a metal chelate cross-linking agent, described above, may be used. Such a cross-linking agent may be present in a suitable amount of 0.01 to 10 parts by weight, and preferably 0.01 to 5 parts by weight with respect to 100 parts by weight of the acryl polymer in consideration of the tensile modulus, durability and cohesion of the pressure-sensitive adhesive layer.

A method of forming such a pressure-sensitive adhesive layer is similar to that for the above-mentioned photocurable pressure-sensitive adhesive layer, except that a curing process by irradiation of an electromagnetic wave is not performed. That is, the pressure-sensitive adhesive layer may be formed by preparing a pressure-sensitive adhesive composition by suitably blending necessary components, coating the composition on a suitable substrate, and curing the composition. When necessary, the thermocurable pressure-sensitive adhesive composition may further include at least one additive selected from the group consisting of a silane coupling agent, a tackifying resin, an epoxy resin, a curing agent, a UV stabilizer, an antioxidant, a colorant, a reinforcing agent, a filler, an antifoaming agent, a surfactant, and a plasticizer.

In the present invention, when the pressure-sensitive adhesive layer is formed in a multi-layered structure having at least two layers, the multi-layered pressure-sensitive adhesive layer may be formed using a suitable one of the above-mentioned thermocurable, room temperature curable, moisture curable and photocurable adhesive compositions, the adhesive layers being formed of the same or different compositions.

In one example, the pressure-sensitive adhesive layer includes a first pressure-sensitive adhesive layer forming a first surface and a second pressure-sensitive adhesive layer forming a second surface. When the first surface is attached to the polarizer, the pressure-sensitive adhesive layer is preferably formed using a pressure-sensitive adhesive composition implementing an IPN structure as the first photocurable pressure-sensitive adhesive composition. Accordingly, in one example, the first pressure-sensitive adhesive layer may include a cross-linking structure including an acryl polymer cross-linked by a multifunctional cross-linking agent and a cross-linking structure including a polymerized multifunctional acrylate.

In one example, the pressure-sensitive adhesive layer may be attached to a polarizer by means of an adhesive layer. In one example, the polarizing plate may further include an adhesive layer directly attached to a surface of the polarizer, specifically, a surface on which a protective film is not formed, and the pressure-sensitive adhesive layer may be directly attached to the adhesive layer. In the present invention, the term "B directly attached to A" means that there is no layer between A and B.

The adhesive layer may be any of a polyvinyl alcohol-based adhesive; an acryl-based adhesive; a vinyl acetate-based adhesive; a urethane-based adhesive; a polyester-based adhesive; a polyolefin-based adhesive; a polyvinylalkylether-based adhesive; a rubber-based adhesive; a vinylchloride-vinylacetate-based adhesive; a styrene-butadiene-styrene (SBS) adhesive; a hydrogenated styrene-butadiene-styrene (SEBS)-based adhesive; an ethylene-based adhesive; and an acrylic acid ester-based adhesive, which are used alone or in combination of at least two thereof. The adhesive layer may be, for example, formed using a water-based, solvent-based, or non-solvent-based adhesive composition. The adhesive composition may also be a thermocurable, room temperature curable, moisture curable or photocurable adhesive composition. In the present invention, the adhesive layer is preferably formed using a photocurable adhesive composition, and more preferably a UV curable adhesive composition, but the present invention is not limited thereto. Examples of the adhesive layers may include a water-based polyvinyl alcohol-based adhesive, a non-solvent acryl-based adhesive, and a non-solvent vinyl acetate-based adhesive.

A method of forming the above-mentioned adhesive layer on a polarizer is not particularly limited, and may for example include coating an adhesive composition on a polarizer, laminating the pressure-sensitive adhesive layer, and curing the coated adhesive composition.

The adhesive layer may have a thickness of 10 to 600 nm, preferably 15 to 500 nm, and more preferably 15 to 450 nm. When the thickness of the adhesive layer is controlled at 10 nm or more, the polarizing plate may maintain excellent water resistance, and when the thickness of the adhesive layer is controlled at 600 nm or less, it is possible to form a uniform adhesive layer.

The polarizing plate of the present invention may further include a protective film attached to a surface of the polarizer, specifically, the surface opposite to that to which the pressure-sensitive adhesive layer is attached. Examples of the protective film may include, but are not limited to, a cellulose-based film such as a TAC film; a polyester-based film such as a poly(ethylene terephthalate) film (PET film); a polycarbonate-based film; a polyethersulfone-based film; and a polyolefine-based film such as an acryl-based film; and/or polyethylene film, a polypropylene film, a polyolefin film having a cyclo or norbornene structure or an ethylene-propylene copolymer film. The protective film may be attached to the polarizer by means of the above-mentioned adhesive layer.

The polarizing plate may further include a releasing film attached to the bottom of the pressure-sensitive adhesive layer. The releasing film may employ a conventional component in the art.

If necessary, the polarizing plate may further include at least one functional layer selected from the group consisting of an anti-reflection layer, an anti-glare layer, a retardation plate, a wide viewing angle compensation film and a brightness enhancing film.

The present invention relates to an LCD device including a liquid crystal panel and a polarizing plate according to the present invention attached to one or both surfaces of the liquid crystal panel.

The kind of the liquid crystal panel included in the LCD device is not particularly limited. For example, all of known panels such as a passive matrix panel such as a twisted nematic (TN), super twisted nematic (STN), ferroelectric (F) or polymer dispersed (PD) panel; an active matrix panel such as a two-terminal or three-terminal panel; an in-plane switching (IPS) panel; and a vertical alignment (VA) panel may be used.

Kinds of other components comprising the LCD device, for example, upper and lower substrates (e.g., a color filter substrate or an array substrate) are not particularly limited, either, and any components known in the art may be employed without limitation.

Advantageous Effects

According to the present invention, a polarizing plate that has a lighter weight and a thinner thickness, and has excellent physical properties such as durability, water resistance, workability, adhesion and light leakage prevention ability under severe conditions, and a liquid crystal display device including the same can be provided.

MODE FOR INVENTION

Figure 1:
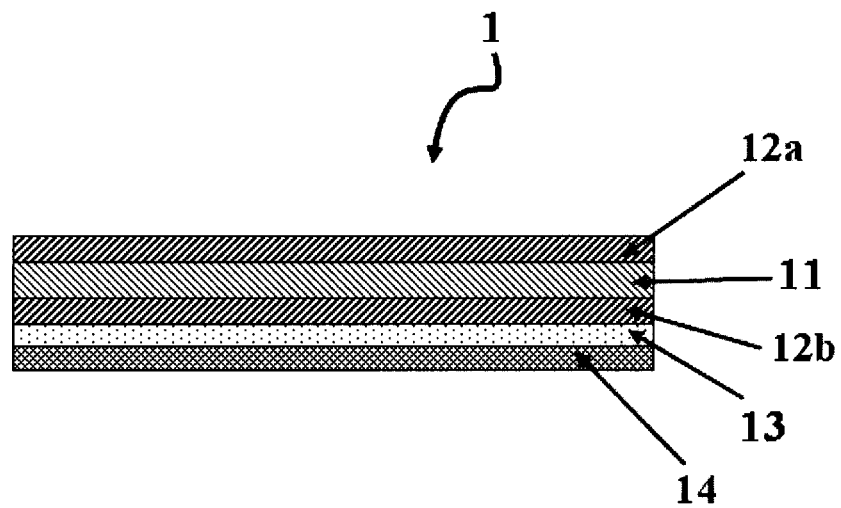
FIG. 1 is a schematic cross-sectional view of a conventional polarizing plate.
Figure 2:
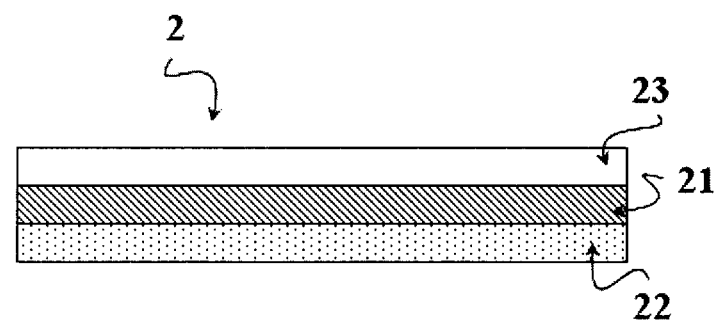
FIG. 2 is a cross-sectional view of an exemplary polarizing plate according to the present invention.
Figure 3:
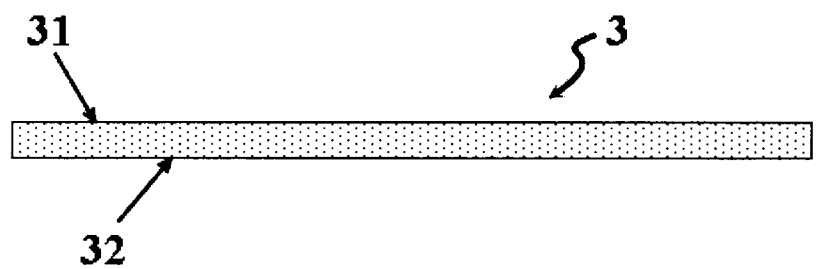
FIGS. 3 and 4 are cross-sectional views of a pressure-sensitive adhesive layer according to the present invention.
Figure 4:
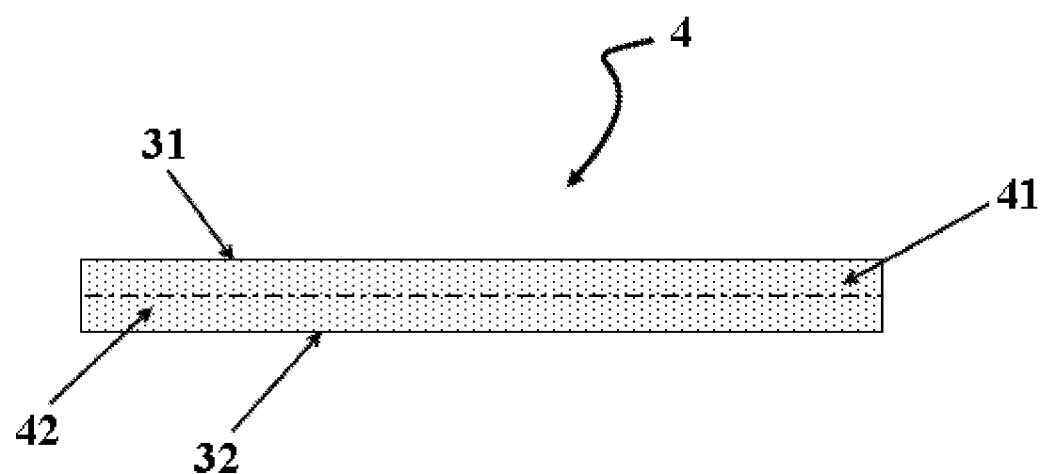

Hereinafter, the present invention will be described with reference to examples and comparative examples in detail. However, the present invention is not limited to these examples.

Preparation Example 1. Preparation of Acryl Polymer (A)

98 parts by weight of n-butyl acrylate (n-BA) and 2 parts by weight of 2-hydroxyethyl acrylate (2-HEA) were put into a 1 L reactor equipped with a cooling device to reflux nitrogen gas and facilitate temperature control. Subsequently, 180 parts by weight of ethyl acetate (EAc) was put into the reactor as a solvent, which was purged with the nitrogen gas for 60 minutes to remove oxygen. Afterwards, the temperature was maintained at 67° C., 0.05 parts by weight of azobisisobutyronitrile (AIBN), as a reaction initiator, was put there into, and the reaction was carried out for 8 hours. After the reaction, the reaction product was diluted with ethyl acetate, and thus an acryl polymer (A) having a solid concentration of 30 wt %, a weight average molecular weight of 1,000,000 and a molecular weight distribution of 4.9 was prepared.

Preparation Examples 2 to 5. Preparation of Acryl Polymers (B) to (D)

Except that the monomer composition was changed as shown in Table 1, acryl polymers (B) to (D) were prepared in the same manner as in Preparation Example 1. Weight average molecular weights and molecular weight distributions of the prepared polymers are summarized in Table 1.

TABLE 1

|  |  | Acryl Polymers | | | |
|---|---|---|---|---|---|
|  |  | A | B | C | D |
| Monomer Composition (Part by Weight) | n-BA | 98 | 98 | 98 | 80 |
|  | 2-HEA | 2 | 2 | — | 20 |
|  | AA | — | — | 2 | — |
| Weight Average Molecular Weight |  | 1000000 | 1900000 | 1000000 | 1000000 |
| Molecular Weight Distribution |  | 4.9 | 5.5 | 5.4 | 4.9 | n-BA: n-butyl acrylate
2-HEA: 2-hydroxyethyl acrylate
AA: Acrylic Acid

Example 1

Formation of First Pressure-Sensitive Adhesive Layer

A first pressure-sensitive adhesive composition was prepared by blending 100 parts by weight of an acryl polymer (A), 3 parts by weight of a multifunctional cross-linking agent (TDI-based Isocyanate, Coronate L, Nippon Polyurethane Industry (Japan)), 100 parts by weight of a multifunctional acrylate (trifunctional urethane acrylate, Aronix M-315), 3 parts by weight of a photoinitiator (Irg 184, hydroxycyclohexylphenylketone, Ciba Specialty Chemical (Swiss), and 0.1 parts by weight of a silane coupling agent (M812, a silane coupling agent having a β-cyanoacetyl group, LG Chemical (Korea)) in a solvent to have a solid concentration of 30 wt %. Subsequently, the prepared pressure-sensitive adhesive composition was coated on a releasing treated surface of a PET releasing film (thickness: 38 μm, MRF-38, Mitsubishi) subjected to releasing treatment to have a thickness of 25 μm after drying, and the resulting film was dried in an oven at 110° C. for 3 minutes. Then, a releasing-treated surface of the releasing-treated PET releasing film (thickness: 38 μm, MRF-38, Mitsubishi) was further laminated on the dried coating layer. Afterwards, a UV ray was irradiated under the following conditions, thereby forming a first pressure-sensitive adhesive layer between two PET releasing films. The formed first pressure-sensitive adhesive layer had a tensile modulus (at 25° C.) of 300 Mpa. The tensile modulus in the example was measured according to the following method.

<Conditions for UV Irradiation>
Apparatus for UV Irradiation: High Pressure Mercury Lamp
Irradiation Conditions:
 Illuminance: 600 mW/cm$^2$
 Amount of Light: 150 mJ/cm$^2$ Formation of Second Pressure-Sensitive Adhesive Layer A second pressure-sensitive adhesive composition was prepared by blending 100 parts by weight of acryl polymer (A), 0.01 parts by weight of a multifunctional cross-linking agent (TDI-based isocyanate, Coronate L, Nippon Polyurethane Industry (Japan)) and 0.1 parts by weight of a silane coupling agent (M812, a silane coupling agent having β-cyanoacetyl group, LG Chemical (Korea)) in a solvent to have a solid concentration of 30 wt %. Subsequently, the prepared pressure-sensitive adhesive composition was coated on a releasing treated surface of a releasing treated PET releasing film (thickness: 38 μm, MRF-38, Mitsubishi) to have a thickness of 25 μm after drying, the resulting film was dried in an oven at 110° C. for 3 minutes to form a second pressure sensitive adhesive later, and the releasing treated PET releasing film (thickness: 38 μm, MRF-38, Mitsubishi) was further laminated. The formed second pressure-sensitive adhesive layer had a tensile modulus (at 25° C.) of 0.06 Mpa.

Subsequently, the first pressure-sensitive adhesive layer and the second pressure-sensitive adhesive layer were laminated on each other, thereby forming a pressure-sensitive adhesive layer having a double-layered structure.

Formation of Polarizing Plate

A polarizer was prepared by stretching a polyvinyl alcohol-based resin film, staining the film with iodine, and treating the resulting film with a boric acid aqueous solution. Subsequently, a 60 μm-thick triacetyl cellulose (TAC) film was attached to one surface of the polarizer using a water-based polyvinyl alcohol-based adhesive. Afterwards, the formed pressure-sensitive adhesive layer having the double-layered structure was laminated to a surface of the polyvinyl alcohol-based polarizer to which a TAC film was not attached using the water-based polyvinyl alcohol-based adhesive. In this step, the first pressure-sensitive adhesive layer was disposed on the polyvinyl alcohol-based polarizer (the structure of the polarizing plate: TAC film→water-based polyvinyl alcohol-based adhesive→ polarizer→water-based polyvinyl alcohol-based adhesive→first pressure-sensitive adhesive layer→second pressure-sensitive adhesive layer→PET releasing film).

Examples 2 to 7 and Comparative Examples 1 to 5

Except that components of first and second pressure-sensitive adhesive layers were changed as shown in Tables 2 and 3, a polarizing plate was formed by the same method as described in Example 1. However, Comparative Examples used a single-layered structure of a single pressure-sensitive adhesive, not a double-layered pressure-sensitive adhesive.

TABLE 2

| | | | Examples | | | | | | |
|---|---|---|---|---|---|---|---|---|---|
| | | | 1 | 2 | 3 | 4 | 5 | 6 | 7 |
| First Pressure-Sensitive Adhesive | Pressure-Sensitive Adhesive Composition | Kind of Acryl Polymer | A | B | C | D | A | A | A |
| | | Content of Acryl Polymer | 100 | 100 | 100 | 100 | 100 | 100 | 100 |
| | | Content of Multifunctional Cross-linking Agent | 3 | 3 | 3 | 3 | 3 | 3 | 3 |
| | | Content of MFA1 | 100 | 100 | 100 | 100 | 100 | — | 100 |
| | | Content of MFA2 | — | — | — | — | — | 50 | — |
| | | Content of Photoinitiator | 3 | 3 | 3 | 3 | 3 | 3 | 3 |
| | | Content of Silane Coupling Agent | 0.1 | 0.1 | 0.1 | 0.1 | 0.1 | 0.1 | 0.1 |
| | | UV Curing Method | ○ | ○ | ○ | ○ | ○ | ○ | ○ |
| | Pressure-Sensitive Adhesive | Thickness (μm) | 25 | 25 | 25 | 25 | 25 | 25 | 25 |
| | | Tensile Modulus | 300 | 300 | 350 | 850 | 300 | 400 | 300 |
| Second Pressure-Sensitive Adhesive | Pressure-Sensitive Adhesive Composition | Kind of Acryl Polymer | A | A | A | A | A | A | C |
| | | Content of Acryl Polymer | 100 | 100 | 100 | 100 | 100 | 100 | 100 |
| | | Multifunctional Cross-linking Agent | 0.01 | 0.01 | 0.01 | 0.01 | 0.01 | 0.01 | 0.01 |
| | | MFA1 | — | — | — | — | 10 | — | — |
| | | MFA2 | — | — | — | — | — | — | — |
| | | Photoinitiator | — | — | — | — | 1 | — | — |

TABLE 2-continued

|  |  |  | Examples | | | | | | |
| --- | --- | --- | --- | --- | --- | --- | --- | --- | --- |
|  |  |  | 1 | 2 | 3 | 4 | 5 | 6 | 7 |
|  |  | Silane Coupling Agent | 0.1 | 0.1 | 0.1 | 0.1 | 0.1 | 0.1 | 0.1 |
|  |  | UV Curing Agent | X | X | X | X | ○ | X | X |
|  | Adhesive | Thickness (μm) | 25 | 25 | 25 | 25 | 25 | 25 | 25 |
|  |  | Tensile Modulus | 0.06 | 0.06 | 0.06 | 0.06 | 0.6 | 0.06 | 0.06 |

Content Unit: Part(s) by Weight
Multifunctional Cross-linking Agent: TDI-based Isocyanate Cross-linking Agent (Coronate L, Nippon Polyurethane Industry)
MFA1: 3-functional Urethane Acrylate (Aronix M-315, Dongwoo Corporation)
MFA2: 6-functional Urethane Acrylate (UA 306I, Kyoeisha Chemical)
Photoinitiator: Hydroxycyclohexylphenyl Ketone (Irg 184, Ciba Specialty Chemical)
Silane Coupling Agent: silane coupling agent having a β-cyanoacetyl group (M812, LG Chemical)
Tensile Modulus: tensile modulus at 25° C., unit: MPa

TABLE 3

|  |  |  | Comparative Examples | | | |
| --- | --- | --- | --- | --- | --- | --- |
|  |  |  | 1 | 2 | 3 | 4 |
| First Pressure-Sensitive Adhesive | Pressure-Sensitive Adhesive Composition | Kind of Acryl Polymer | A | A | A | A |
|  |  | Content of Acryl Polymer | 100 | 100 | 100 | 100 |
|  |  | Content of Multifunctional Crosslinking Agent | 3 | 0.01 | 0.01 | 0.01 |
|  |  | Content of MFA1 | 100 | — | 10 | 10 |
|  |  | Content of MFA2 | 3 | — | — | — |
|  |  | Content of Photoinitiator | 3 | — | 1 | 1 |
|  |  | Content of Silane Coupling Agent | 0.1 | 0.1 | 0.1 | 0.1 |
|  |  | UV Curing Method | ○ | X | ○ | ○ |
|  | Pressure-Sensitive Adhesive | Thickness (μm) | 25 | 25 | 25 | 50 |
|  |  | Tensile Modulus (MPa) (25° C.) | 300 | 0.06 | 0.6 | 0.6 |

Content Unit: Part(s) by Weight
Multifunctional Crosslinking Agent: TDI-based Isocyanate Crosslinking Agent (Coronate L, Nippon Polyurethane Industry)
MFA1: 3-functional Urethane Acrylate (Aronix M-315, Dongwoo Corporation)
MFA2: 6-functional Urethane Acrylate (UA 3061, Kyoeisha Chemical)
Photoinitiator: Hydroxycyclohexylphenyl ketone (Irg 184, Ciba Specialty Chemical)
Silane Coupling Agent: silane coupling agent having a β-cyanoacetyl group (M812, LG Chemical)

<Evaluation of Physical Properties>

1. Evaluation of Tensile Modulus

Herein, the tensile modulus of the pressure-sensitive adhesive was measured by a tensile stress-strain test according to a method defined in ASTM D638, or when it was difficult to directly measure the tensile modulus, a storage modulus was measured by the following method and then converted by the following formula. Specifically, a sample having a stacked structure of a PET releasing film (thickness: 38 μm, MRF-38), a pressure-sensitive adhesive layer and a PET releasing film (thickness: 38 μm, MRF-38), prepared in Examples or Comparative Examples, was cut into a dog bone-type specimen to a size of 7 cm (length)×1 cm (width). Both ends of the specimen were fixed with tensile test jigs, and a tensile modulus was measured according to ASTM D638. The conditions for measuring the tensile modulus were as follows.

<Conditions for Measuring Tensile Modulus>

Measuring Apparatus: Universal Test Machine (UTM)
Equipment Model: Zwick Roell Z010, Instron Measurement Conditions:
Load Cell: 500 N
Tensile Speed: 3 mm/sec <Measurement of Storage Modulus and Conversion into Tensile Modulus>

A pressure-sensitive adhesive layer was cut to a size of 15 cm×25 cm×25 μm (width×length×thickness), and 5 pressure-sensitive adhesive layers cut as described above were stacked. Subsequently, the stacked pressure-sensitive adhesive layers were cut in a circle having a diameter of 8 mm, and pressed using glasses overnight to improve a wetting property at an interface between layers, thereby removing air bubbles generated during stacking. As a result, a specimen was prepared. Subsequently, the specimen was placed on a parallel plate, and a gap was adjusted. Then, a zero point of Normal & Torque was adjusted, the stability of a normal force was checked, the storage modulus was measured under the following conditions, and the tensile modulus was calculated according to the following conversion formula.

Measurement Apparatus and Measuring Conditions
Measurement Apparatus: ARES-RDA, TA Instruments Inc. with forced convection oven
Measuring Conditions:
Geometry: 8 mm parallel plate
Gap: around 1 mm
Test Type: dynamic strain frequency sweep
Strain=10.0 [%], temperature: 30° C.
Initial Frequency: 0.4 rad/s, final frequency: 100 rad/s $$E=3G \qquad \text{<Conversion Formula>}$$

In the above formula, E is a tensile modulus, and G is a storage modulus.

2. Evaluation of Peeling Force and Repeelable Characteristic

A polarizing plate was cut to a size of 25 mm×100 mm (width×length), and thus a specimen was prepared. Subsequently, a PET releasing film was peeled from the specimen, and the polarizing plate specimen was attached to a non-alkali glass by means of a pressure-sensitive adhesive layer using a laminator. Afterwards, the resulting product was pressed in an autoclave (50° C., pressure of 0.5 atm) for approximately 20 minutes, and stored under a constant temperature and humidity (23° C., 50% relative humidity) for 25 hours. Then, while the polarizing plate was peeled from the non-alkali glass using a texture analyzer (TA) apparatus (Stable Microsystem (UK)) at a peel rate of 300 mm/min and a peel angle of 180 degrees, a peeling force was measured. Furthermore, the repeelable characteristic was evaluated according to the following criteria.

<Criteria for Evaluation of Repeelable Characteristic>
- ○: Peeling force of 800 N/25 mm or less as measured one day after the attachment
- Δ: Peeling force of 1,000 N/25 mm or more as measured one day after the attachment
- x: Peeling force of 2,000 N/25 mm or more as measured one day after the attachment 3. Evaluation of Durability and Reliability The polarizing plates formed in Examples and Comparative Examples were cut to a size of 90 mm×170 mm (width×length), thereby preparing two specimens for each Example or Comparative Example. Subsequently, two specimens were attached to both surfaces of a glass substrate (110 mm×190 mm×0.7 mm=width×length×thickness). However, the specimens were attached with their optical absorbance axes crossing each other, thereby forming a sample. A pressure applied to the substrate during the attachment was approximately 5 kg/cm$^2$, and works were performed in a clean room to avoid the generation of air bubbles or foreign materials to interfaces.

The humidity and heat resistance of the sample was determined by observing whether air bubbles were generated or peeling occurred at a pressure-sensitive adhesive interface after the sample was maintained for 1000 hours under conditions including a temperature of 60° C. and a relative humidity of 90%.

Furthermore, the heat resistance was determined by observing whether air bubbles were generated or peeling occurred at a pressure-sensitive adhesive interface after the sample was maintained for 1000 hours at a temperature of 80° C.

Samples formed just before measurements of the humidity or heat durability and reliability were left for 24 hours at room temperature, and then evaluated. Evaluation conditions were as follows.

<Criteria for Evaluation of Durability and Reliability>
- ○: No air bubbles or peeling was generated.
- Δ: Air bubbles and/or peeling was somewhat generated.
- x: Air bubbles and/or peeling was considerably generated.

4. Evaluation of Water Resistance

Polarizing plates prepared in Examples and Comparative Examples were cut to a size of 90 mm×170 mm (width×length), thereby forming specimens. Each specimen was attached to one surface of a glass substrate (110 mm×190 mm×0.7 mm=width×length×thickness), thereby forming a sample. A pressure applied during the attachment was approximately 5 kg/cm$^2$, and works were performed in a clean room to avoid the generation of air bubbles or foreign materials to interfaces. Subsequently, the sample was put into water at 60° C., kept for 24 hours, and then taken out to observe whether air bubbles or peeling was generated. Thereby, the water resistance was evaluated according to the following criteria.

<Criteria for Evaluation of Water Resistance>
- ○: No air bubbles or peeling was generated.
- Δ: Air bubbles and/or peeling was somewhat generated.
- x: Air bubbles and/or peeling was considerably generated.

5. Evaluation of Uniformity in Light Transmission

The polarizing plates prepared in Examples and Comparative Examples were attached to a 22-inch LCD monitor (LG Philips LCD) in a state in which optical absorption axes crossed each other, stored for 24 hours under constant temperature and humidity (23° C., 50% relative humidity), and left at 80° C. for 200 hours. Afterwards, light was irradiated to the monitor using a back light in a dark room, and the uniformity in light transmission was evaluated according to the following criteria.

<Criteria for Evaluation of Uniformity in Light Transmission>
- ⊚: Non-uniformity in light transmission was not observed with the naked eye at four peripheral parts of the monitor
- ○: Non-uniformity in light transmission was slightly observed with the naked eye at four peripheral parts of the monitor
- Δ: Non-uniformity in light transmission was somewhat observed with the naked eye at four peripheral parts of the monitor
- x: Non-uniformity in light transmission was significantly observed with the naked eye at four peripheral parts of the monitor 6. Evaluation for Weight Average Molecular Weight and Molecular Weight Distribution The weight average molecular weight and the molecular weight distribution of an acryl polymer were measured using a GPC under the following conditions. To draw a calibration curve, standard polystyrene of an Agilent system was used, and measurement results were converted.

<Conditions for Measuring Weight Average Molecular Weight>
Measuring Apparatus Agilent GPC (Agilent 1200 series, USA)
Column: two connected PL mixed B
Column Temperature: 40° C.
Eluent: Tetrahydrofuran
Flow Rate: 1.0 mL/min
Concentration: ~2 mg/mL (100 μL injection)

The measurement results are summarized and shown in Table 4.

TABLE 4

|  |  | Peeling force (N/25 mm) | Re-peelable characteristic | Heat Durability | Humidity Durability | Water Resistance | Uniformity in Light Transmission |
|---|---|---|---|---|---|---|---|
| Examples | 1 | 500 | ○ | ○ | ○ | ○ | ⊚ |
|  | 2 | 500 | ○ | ○ | ○ | ○ | ⊚ |
|  | 3 | 500 | ○ | ○ | ○ | ○ | ⊚ |
|  | 4 | 500 | ○ | ○ | ○ | ○ | ⊚ |
|  | 5 | 400 | ○ | ○ | ○ | ○ | ⊚ |
|  | 6 | 500 | ○ | ○ | ○ | ○ | ○ |
|  | 7 | 800 | ○ | ○ | ○ | ○ | ○ |
| Comparative Examples | 1 | 30 | ○ | x | x | x | x |
|  | 2 | 500 | Δ | x | x | x | x |
|  | 3 | 500 | ○ | Δ | x | x | x |
|  | 4 | 500 | ○ | Δ | Δ | Δ | Δ |

DESCRIPTION OF REFERENCES 1,2: a polarizing plate
3, 4, 13, 22: a pressure sensitive adhesive layer
11, 21: a polarizer
12a, 12b, 23: a protecting film
31: a first surface
32: a second surface
41: a first pressure sensitive adhesive layer
42: a second pressure sensitive adhesive layer

The invention claimed is:
1. A polarizing plate, comprising:
a polarizer;
an adhesive layer directly attached to at least one surface of the polarizer; and an acrylic pressure-sensitive adhesive layer directly attached to the adhesive layer, wherein the acrylic pressure-sensitive adhesive layer includes a first layer and a second layer, and wherein the first layer is directly adjacent to the adhesive layer and has a tensile modulus at 25° C. of 300 MPa to 850 MPa, and the second layer has a tensile modulus at 25° C. of 0.01 MPa to 1.0 MPa, and wherein the first layer comprises a cross-linking structure comprising an acryl polymer cross-linked by a multifunctional cross-linking agent and a cross-linking structure comprising a polymerized multifunctional acrylate.

2. The polarizing plate according to claim 1, wherein the second layer has a pressure-sensitive adhesive surface for attaching the polarizing plate to a liquid crystal panel.

3. The polarizing plate according to claim 1, wherein the polarizer is a polyvinyl alcohol-based polarizer.

4. The polarizing plate according to claim 1, wherein the acrylic pressure-sensitive adhesive layer has a thickness of 10 to 80 μm.

5. The polarizing plate according to claim 1, wherein the adhesive layer includes at least one selected from the group consisting of a polyvinyl alcohol-based adhesive; an acryl-based adhesive; a vinyl acetate-based adhesive; a urethane-based adhesive; a polyester-based adhesive; a polyolefin-based adhesive; a polyvinylalkylether-based adhesive; a rubber-based adhesive; a vinylchloride-vinylacetate-based adhesive; a styrene-butadiene-styrene adhesive; a hydrogenated styrene-butadiene-styrene-based adhesive; an ethylene-based adhesive; and an acrylic acid ester-based adhesive.

6. The polarizing plate according to claim 1, wherein the adhesive layer includes a thermocurable adhesive composition, a room temperature curable adhesive composition, a moisture curable adhesive composition, or a photocurable adhesive composition in a cured state.

7. The polarizing plate according to claim 1, further comprising:
a protective film attached to the surface to which the acrylic pressure-sensitive adhesive layer of the polarizer is not attached.

8. The polarizing plate according to claim 1, wherein the second layer has a tensile modulus at 25° C. of 0.03 to 0.7 MPa.

9. The polarizing plate according to claim 1, wherein the polymerized multifunctional acrylate is present in an amount of 20 to 200 parts by weight with respect to 100 parts by weight of the acryl polymer.

10. A liquid crystal display device, comprising:
a liquid crystal panel; and
a polarizing plate according to claim 1 attached to one or both surfaces of the liquid crystal panel.

11. The device according to claim 10, wherein the liquid crystal panel is a passive matrix panel, an active matrix panel, an in-plane switching panel or a vertical alignment panel.

* * * * *